United States Patent Office

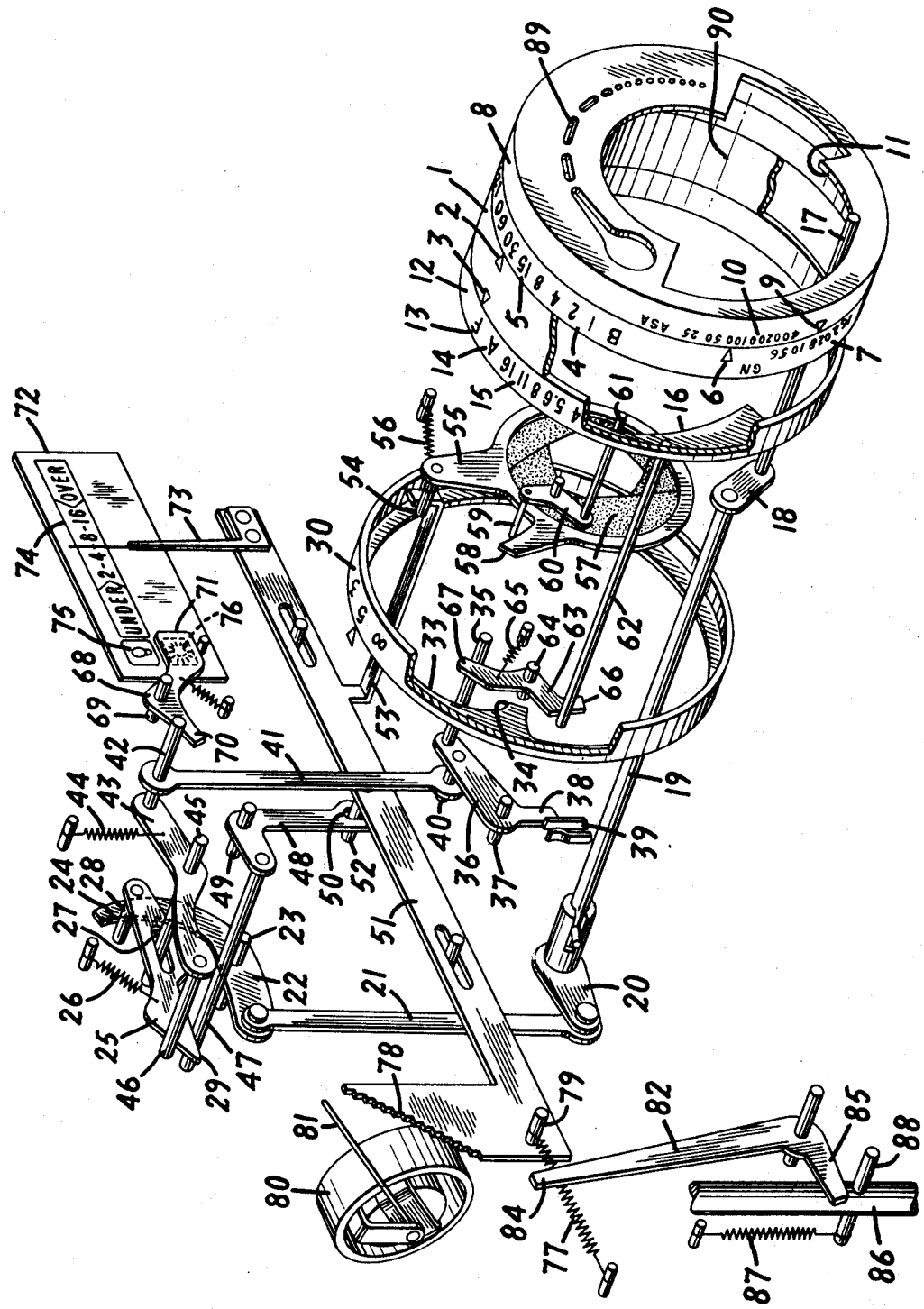

3,492,928
Patented Feb. 3, 1970

3,492,928
AUTOMATIC EXPOSURE CONTROL DEVICE IN FLASHLIGHT PHOTOGRAPHY
Kiyoshi Kitai, Tokyo, Japan, assignor to Kabushiki Kaisha Hattori Tokeiten, Tokyo, Japan, a Japanese corporation
Filed June 14, 1967, Ser. No. 645,986
Claims priority, application Japan, June 23, 1966, 41/40,556
Int. Cl. G03b 7/12
U.S. Cl. 95—10                                   3 Claims

ABSTRACT OF THE DISCLOSURE

A camera mechanism for adjusting and setting aperture size and having provisions to prevent incorrect exposure at long distances. The movement of the distance setting means is limited to a predetermined distance value by a stop cooperative with distance transmitting members.

BACKGROUND OF THE INVENTION

This invention relates to a camera and more particularly to an automatic flash exposure mechanism.

In automatic flash exposure mechanisms, it is known that the aperture size must be adjusted in accordance with the photographic distance, the guide number of the flash bulb and the film sensitivity. However, when an adjusting member for the diaphragm is displaced by adjustment of the photographic distance by means of a distance adjusting member, the amount of the displacement of the diaphragm adjusting member for a long distance setting is very slight compared with the displacement for a short distance setting. In the case of long distances, this causes great error in the adjusting of the aperture size so that it is impossible to attain the purpose of desired automatic exposure.

SUMMARY OF THE INVENTION

It is a principal object of the present invention to provide a new and improved mechanism in which an intermediate member limits the working range of the distance adjusting member for automatic flashlight photography.

Another object of the invention is to provide a new and improved mechanism by means of which the aperture size of the diaphragm is manually or automatically adjusted for flashlight photography.

According to the invention, there is provided in combination with diaphragm means operable selectively to define an exposure aperture of the same and different sizes, diaphragm adjusting means for adjusting the aperture size, translationally movable means for operating the diaphragm adjusting means and rotatable distance setting means and flash bulb guide number setting means. The combination further comprises means operatively connecting the setting means to the translationally movable means for translation of the latter by rotation of the former whereby the aperture size is adjusted. Moreover, there is provided means for preventing rotation of the distance setting means when the distance is greater than a predetermined value whereby underexposure is prevented.

Further objects and advantages of the present invention will become apparent and the invention will be better understood from the following description.

BRIEF DESCRIPTION OF THE DRAWING

The drawing is a diagrammatic exploded view of a mechanism according to the invention.

DESCRIPTION OF A PREFERRED EMBODIMENT

According to the drawing, the camera case is not shown and the components of the camera and mechanism of the invention are illustrated diagrammatically in relative positions. As shown in the drawing, an exposure time adjusting ring 4 and a diaphragm adjusting ring 12 are rotatably mounted on a ring holder 1 of a mirror cylinder. An exposure time scale 5 on the exposure time adjusting ring and a flashlight photography mark 13, daylight automatic photography mark 14 and diaphgram scale 15 on the diaphragm adjusting ring respectively are indicated by indicator marks 2 and 3 on the ring holder 1. The exposure time adjusting ring 4 is provided also with an indicator mark 6 and a guide number scale 7. A film sensitivity scale 10 and an indicator mark 9 are provided on a guide number adjusting ring 8 to respond to the mark 6 and the scale 7. The exposure time adjusting ring 4 is rotatable individually or together with the guide number adjusting ring 8 around an optical axis 90. The guide number adjusting ring 8 also has a cam 11 and iris 89 for a photoconductor of an exposure meter. Against the cam 11 is abutted a shaft 17 which is connected by means of a link 18 to a rotary shaft 19. On the other end of the rotary shaft 18 there is a connecting lever 21 pivoted on a guide number lever 22 through a link 20. The guide number lever 22 is pivoted on a shaft 23 mounted in the camera body. On the other end of the guide number lever 22 is provided an arcuate surface 24. A translating lever 25 is provided with a groove 27 in the middle thereof, into which is inserted a rotary shaft 45 of a distance lever 43 as later described.

The translating lever 25 also has a wedge head 29 and a pin 28 which abuts against the arcuate surface 24 of the guide number lever 22, and a spring 26 urges the translating lever 25 to rotate in the clockwise direction around the rotary shaft 45. On the other hand, a rotatable distance adjusting ring 30 is provided to adjust the photographic distance and has a cam 33 and a stopper 34. The cam 33 acts upon a shaft 35 of a convertible lever 36 pivoted about a rotary shaft 37 mounted in the camera body.

A pin 40 on the back side of the convertible lever 36 is connected to a pin 42 on one end of the distance lever 43 through a connecting lever 41. The other end 38 of the convertible lever 36 faces an electric contact 39. The distance lever 43 is pivoted on the rotary shaft 45, which rotary shaft 45 is inserted in the groove 27 of the translating lever 25 as described above. A pin 46 projecting from the distance lever 43 abuts the upper rim of the wedge head 29 of the translating lever 25. The distance lever 43 is urged to turn in the counterclockwise direction by the spring 44. Abutting against the lower rim of the wedge head 29 is a pin 47 mounted on one end of an intermediate lever 48 pivoted on a shaft 49 mounted in the camera body. By a fork 50 at the other end of the intermediate lever 48 is held a pin 52 on the back surface of a diaphragm adjusting lever 51 which is guided by groove and pin to the left or the right.

A projection 53 is provided on the front surface of the diaphragm adjusting lever 51 to engage with a projection 54 on a ring 55 which tends to close the iris diaphragm by a spring 56. The cam 16 of the diaphragm adjusting ring 12 is abutted against by a pin 61 of a diaphragm lever 60. A pin 59 on the other end of the diaphragm lever 60 is provided for engaging with another projection 58 of the diaphragm ring 55.

Particularly, the invention comprises a stopper 34 for engaging with the shaft 35. The latter is engaged with one end 67 of a change-over lever 63 pivoted on a shaft 64 to cause the shaft 35 to recede from the cam 33 and urged in the clockwise direction by a spring 65. A shaft 62 on the diaphragm adjusting ring 12 engages the other end 66 of the change-over lever 63. Further, the diaphragm adjusting lever 51 has a pointer 73 which points to a dial plate 74 for indicating correct, over and under-exposure in a finder mask 72. The finder mask 72 includes a dial 75 for the flashlight photographing and a dial 76 for daylight photographing. A screening plate 71 on one end of a dial lever 68 pivotally mounted on a shaft 69 can cover either one of the dials 75 and 76 while its other end 70 engages the pin 42 of the distance lever 43.

The diaphragm adjusting lever 51 has a great number of steps 78 which engage a pointer 81 of an exposure meter 80 and is urged to the left by a spring 77. A pin 79 on the lever 51 engages one end 84 of an interlocking lever 82, the other end of which 85 is engaged with a projection 88 of a release shaft 86 which is caused to tend to project by means of a spring 87. The contact 39 is opened or closed by one end 38 of the convertible lever 36 and thereby opens or closes the current of the meter.

In operation, the present invention comprising the above-mentioned construction provides for daylight photography by way of manual opening or closing of the iris diaphragm, and flashlight photography as well as daylight automatic exposure photography and flashlight automatic exposure photography.

In the case of daylight photography, the exposure time adjusting ring 4 is turned so as to determine the exposure time of a shutter, the scale 15 of the diaphragm control ring 12 is rotated so that the mark 3 points to the value as considered being correct. Then, the diaphragm control ring 12 turns considerably in the clockwise direction so that the shaft 62 is released from engagement with the end 66 of the change-over lever 63 which in turn is rotated in the clockwise direction by the spring 65 thus making the shaft 35 of the convertible lever 36 recede to a position which is not in contact with the cam 33 and the stopper 34 of the distance control ring 30. The other end 38 of the convertible lever 36 closes the contact 39, operates the meter 80, swings the meter pointer 81 corresponding to the operation of a photoconductor thus allowing the determination of the brightness of an object. Simultaneously, with this operation, rotation of the convertible lever 36 in the clockwise direction causes the distance lever 43 to turn against the spring 44, and then the pin 46 on the other end of the distance lever 43 leaves the wedge head 29 of the translating lever 25. The translating lever 25 also turns in the clockwise direction driven by the spring 26, thereby leaving the pin 47. Thus, the intermediate lever 48 becomes free. Simultaneously, the pin 42 turns the dial lever 68 in the counter clockwise direction and its screening plate 71 shelters the flashlight photography dial 75 and opens the daylight photography dial 76. By the rotation of the diaphragm adjusting ring 12 the manual diaphragm cam 16 turns to the position in contact with the pin 61 of the manual diaphragm lever 60. In response to the position of the cam 16 of the diaphragm adjusting ring 12, the manual diaphragm lever 60 rotates the diaphragm ring 55 through the pin 59 and the projection 58 to adjust the aperture size of blades 57.

For daylight automatic exposure photography, if the diaphragm adjusting ring 12 is turned to set the daylight automatic photography mark 14 at the mark 3, still the engagement of the shaft 62 and the change-over lever 63 is being broken, the convertible lever 36 recedes to the inoperative position and the control lever 48 remains in a free condition. The contact 39 of the exposure meter is closed, while, by the rotation of the diaphragm adjusting ring 12, the engagement of the pin 61 of the manual diaphragm lever 60 and the manual diaphragm cam 16 is released. Accordingly, by pushing down of the release shaft 86, the interlocking lever 82 rotates and the diaphragm adjusting lever 51 is pulled by the spring 77 as shown in the drawing so that the step 78 shifts to the left until it abuts against the meter pointer 81 and stops at a position by engagement of both devices. Therefore, the diaphragm ring 55 is rotated in response to the displacement of the diaphragm adjusting lever 51 through the projection 53 and the pin 54 to adjust the aperture size of the blades 57. Means other than meters may be used for detecting the brightness of the object.

For flashlight automatic exposure photography, the exposure time adjusting ring 4 is set to a predetermined exposure time as for example $\frac{1}{30}$ second and the diaphragm adjusting ring 12 is turned to set the flashlight photography mark 13 at the mark 3. By the above described operation, the diaphragm adjusting ring 12 is turned in the counterclockwise direction.

The shaft 62 engages one end 66 of the change-over lever 63 and turns the latter in the counterclockwise direction against the spring 65 so that the other end 67 leaves the shaft 35 of the convertible lever 36 and the shaft 35 is engaged with the distance cam 33. Simultaneously, the distance lever 43 is rotated in the counterclockwise direction to adjust the intermediate lever 48 through the translating lever 25 and the pin 47, and the other end 38 of the convertible lever 36 opens the contact 39 and interrupts the operation of the exposure meter. Associated with this operation, the pin 42 turns in the counterclockwise direction, releases the dial lever 68 resulting in that the screening plate 71 covers the daylight photography dial 76 and opens the flash light photography dial 75. The guide number adjusting ring 8 is turned relative to the exposure time adjusting ring 4 to set the mark 9 to a position on the scale 7 in consideration of the guide number of the flash bulb to be used. The guide number cam 11 actuates the shaft 17 which rotates the rotary shaft 19 through the link 18, and the guide number lever 22 is rotated around its rotary shaft 23 through the link 20 while the arcuate surface 24 of its other end pushes the pin 28 of the correction lever 25 so that the wedge head 29 is displaced to the left or right to vary the interspace between the pin 46 and the pin 47 which engage with the upper and lower edges of the wedge head 29 according to the guide number.

Further, when the distance adjusting ring 30 is turned to decide the photographic distance, the distance cam 33 actuates the shaft 35 of the convertible lever 36. Then the distance lever 43 is turned around the rotary shaft 45 through the distance connecting lever 41, whereby the translating lever 25 turns around the rotary shaft 45 and its pin 46 drives the pin 47 of the intermediate lever 48. Therefore, the intermediate lever 48 turns around its shaft 49 and operates the diaphragm adjusting lever 51, the engaging of the pin 52 by the fork 50 shifting the diaphragm adjusting lever 51 to the left or the right. The projection 53 actuates the pin 54 of the diaphragm ring 55 to adjust the aperture size of the blades 57 in accordance with the guide number of the flash bulb and the photographic distance. At this time the aperture size is presented upon the dial 74 of the finder mask 72 by the pointer 73.

When the brightness of the flash bulb is great and the photographic distance is very short, over-exposure occurs even if the aperture size of the blades 57 is adjusted to a minimum. When the brightness of the flash bulb is low and the photographic distance is great, under-exposure occurs even if the aperture of the blades 57 is fully opened. However, if the photographic distance becomes too long, exceeding a predetermined distance, even though the correct aperture size can be obtained, the amount of rotation of the distance adjusting ring 30 corresponding to distance will be extremely small and there is a resultant notably great error in aperture size. Therefore, according to the invention, the distance cam 33 is specifically provided with the stopper 34 so that the latter will engage the shaft 35 and make it impossible to rotate the distance adjusting ring 30 when the shaft 35 is adjusted at over a predetermined distance in the case of flashlight automatic exposure. However, in flashlight photography, in case it is desired to take a photograph at a long distance exceeding the predetermined one, the diaphragm adjusting ring 12 may be set manually to a value on the diaphragm scale 15 which is estimated to be adequate. By this operation, the shaft 62 of the diaphragm adjusting ring 12 is turned and it is lifted out of engagement with the change-over lever 63 as in the case of daylight photography. As a consequence, the engagement of the distance cam 33 and the shaft 35 is broken. At the same time the shaft 35 recedes from the position of engagement with the stopper 34 and the limitation of the operation of the distance adjusting ring 30 is removed whereby flashlight photography is made possible at a preferred long distance. At this moment, the contact 39 of the exposure meter circuit closes, which, however, does not obstruct the adjusting of the diaphragm since the light intensity is low and the meter pointer 81 has receded from the position of engagement with the steps 78 of the diaphragm adjusting lever 51.

I claim:

1. In a photographic camera, in combination, diaphragm means operable selectively to define an exposure aperture of the same and different sizes for effecting photographic exposures, diaphragm adjusting means for adjusting the aperture size, translationally movable means for operating the diaphragm adjusting means, rotatable distance setting means for setting the distance from the camera to the subject to be photographed, rotatable flash bulb guide number setting means, means operatively connecting said distance setting means and said flash bulb guide number setting means to said translationally movable means so that rotational movement of said two setting means causes translational movement of said translationally movable means whereby the aperture size is adjusted and means for preventing the rotation of the distance setting means when the distance from the camera to the subject to be photographed is greater than a predetermined value, means for disconnecting the diaphragm adjusting means from the distance setting means when a subject to be photographed is beyond said predetermined distance, means for detecting the brightness of the subject, operative connection means connecting said brightness detecting means being to said diaphragm adjusting means for automatic adjustment of the aperture size in response to the brightness of the subject, said operative connection connecting the brightness detecting means to the diaphragm adjusting means comprising means permitting optional manual adjustment of the diaphragm adjusting means.

2. In a photographic camera according to claim 1, further comprising means for displaying the aperture size.

3. In a photographic camera, in combination, diaphragm means operable selectively to define an exposure aperture of the same and different sizes for effecting photographic exposures, diaphragm adjusting means for adjusting the aperture size, translationally movable means for operating the diaphragm adjusting means, rotatable distance setting means having a stop, distance transmitting members engaging with said distance setting means, rotatable flash bulb guide number setting means, guide number transmitting members engaging with said guide number setting means, means operatively connecting said distance setting means and said flash bulb guide number setting means to said translationally movable means through said distance transmitting member to effect translational movement of said translationally movable means upon rotational movement of said two setting means whereby the aperture size is adjusted, and said distance setting means being prevented from rotation by engagement of said stop of the distance setting means and said distance transmitting members when the distance from the camera to the subject to be photographed is greater than a predetermined value.

References Cited

UNITED STATES PATENTS

| 3,118,356 | 1/1964 | Sauer et al. |
| 3,269,295 | 8/1966 | Koppen. |
| 3,338,145 | 8/1967 | Rentschler et al. |
| 3,344,726 | 10/1967 | Weller. |

NORTON ANSHER, Primary Examiner

J. F. PETERS, JR., Assistant Examiner

U.S. Cl. X.R.

95—64